J. C. GORDON.
SOCKET OR DEVICE FOR RECEIVING OR BEARING SCREWS SUCH AS ARE EMPLOYED FOR FASTENING PURPOSES.
APPLICATION FILED NOV. 21, 1918.

1,311,646. Patented July 29, 1919.

Inventor:-
John Charles Gordon,
By:- B. Singer, Atty.

THE COLUMBIA PLANOGRAPH CO., WASHINGTON, D. C.

UNITED STATES PATENT OFFICE.

JOHN CHARLES GORDON, OF BIRMINGHAM, ENGLAND.

SOCKET OR DEVICE FOR RECEIVING OR BEARING SCREWS SUCH AS ARE EMPLOYED FOR FASTENING PURPOSES.

1,311,646.  Specification of Letters Patent.  Patented July 29, 1919.

Application filed November 21, 1918. Serial No. 263,528.

*To all whom it may concern:*

Be it known that I, JOHN CHARLES GORDON, a subject of the Kingdom of Great Britain, residing at 72 Sarehole road, Hall Green, Birmingham, in the county of Warwick, England, electrical engineer, have invented new or Improved Sockets or Devices for Receiving or Bearing Screws Such as are Employed for Fastening Purposes, of which the following is a specification.

This invention comprises a new or improved socket or device for receiving or bearing screws, such as are employed for fastening purposes.

The socket or device according to the present invention is adapted to be secured or embedded in cement, lead, or the equivalent, within an aperture in a wall or other part in relation to which the screw is to be secured, and by the present invention the socket or device is adapted to be positioned with particular accuracy and mounted with a high degree of security whereby the screw is enabled to have a particularly effective bearing or anchorage for retaining the part or member which it is adapted to secure.

According to the present invention, the device for receiving the screw is comprised of a member adapted to internally engage with the thread of the screw, and which member is externally provided with locating portions adapted to position and retain said member in an aperture in which it is adapted to be secured by a suitable filling.

In order that this invention may be clearly understood and readily carried into practice, reference may be had to the appended explanatory sheet of drawings, upon which:—

In a convenient embodiment of the present invention, the socket is composed of a helix $a$ or spiral of wire, with the interior of which the thread of the screw $b$ is adapted to engage. This helix or spiral of wire is formed with a series of radial projections or distance pieces $c$ which are so incorporated that the helix or spiral may be located centrally or axially in a hole $d$ in which it is adapted to be received. The projections $c$ are advantageously located radially and are distributed longitudinally of the socket and in differing radii, these projections being of the same radial length so that when the socket is inserted within a hole $d$ of internal diameter corresponding with the diameter at which the projections of the socket terminate, the socket is correctly maintained axially within the aperture within which it is inserted. Cement $e$ may then be introduced into the aperture around the helix or spiral, and the latter is thus effectively secured. The projections $c$ which have previously served to center the socket now serve to assist in preventing axial displacement of the latter in its cement $e$ or other supporting or retaining medium.

The projections $c$ are advantageously formed integrally in the wire of the helix for which purpose in any turn of the helix the wire extends radially outwardly; then bends through 180°, and then extends inwardly in contiguity with the outwardly extending portion until it is again bent to form a continuation of the turn of the helix.

If desired, the extremities of the projections may be bent at right angles to extend in a direction in parallelism with the axis of the socket. These bent portions of the projections may, when in use, be adapted to project toward the face of the wall or other surface in which the hole has been made, and when the socket is embedded the said bent parts convert the projections into hooks which still more firmly obstruct any stress tending to extract the socket from the material in which it is embedded.

If desired, at each end of the helix the wire may be carried externally longitudinally (not shown) and bent around the projection nearest the respective end.

The device according to the present invention may be constructed of any gage wire, the gage varying according to the pitch of the thread of the screw which the socket is adapted to accommodate. The helix with the projections may be formed in continuous lengths adapted to be cut into sockets of the desired length.

In an alternative embodiment of the present invention (not shown) the socket may be cast advantageously with the projections formed integrally thereon, and the screw thread can if desired be afterward turned therein.

Figure 1:
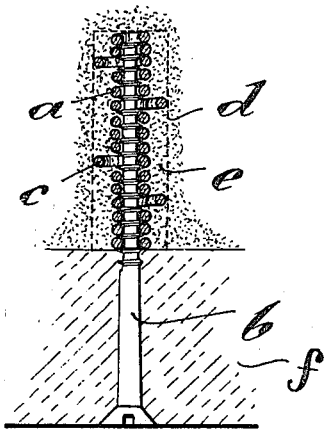
Figure 1 illustrates in section a screw installed by the use of the present invention.
Figure 2:
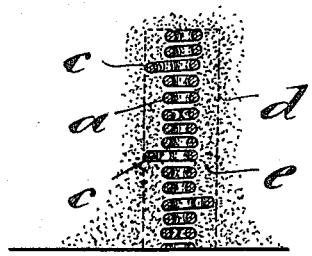
Fig. 2 illustrates the present invention incorporated prior to the assemblage of the screw.
Figure 3:
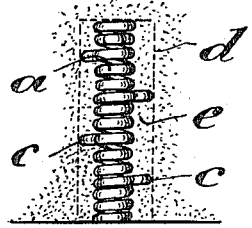
Fig. 3 is a view similar to Fig. 2, but illustrating the present invention in elevation.
Figure 5:
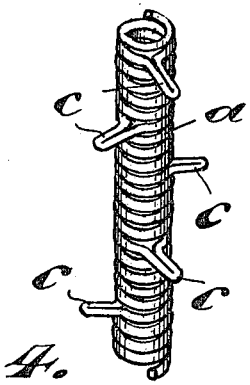
Fig. 5 illustrates separately in perspective the embodiment of the present invention shown in the preceding figures.
Figure 4:
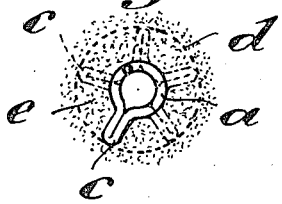
Fig. 4 illustrates in axial elevation the parts shown in Fig. 3.

In utilizing the socket or device according to the present invention, the screw, which is advantageously first dipped in oil when cement is to be used, or whitening and water when lead is to be used, is primarily screwed into the socket, after which the latter containing the screw is inserted in the aperture provided for its reception, which may, for instance, be a blind hole drilled in a wall, floor, ceiling, or other part in which the socket is to be installed; cement, lead, or the like is then inserted around the socket and allowed to set. The socket is thereby effectively installed and the screw can be readily unscrewed therefrom at any time when desired. $f$, Fig. 1, represents a part which is secured by the screw $b$.

What I claim as my invention and desire to secure by Letters Patent is:—

A socket or device for receiving a screw, composed of a helix or spiral of wire furnished with a series of integral projections or distance parts which are so located that the helix or spiral may be positioned centrally or axially in a hole in which it is adapted to be received, said projections being adapted to form retaining portions for the socket when the part of the hole around the socket is filled with cement, lead, or other appropriate filling.

In witness whereof I have hereunto set my hand in the presence of two witnesses.

JOHN CHARLES GORDON.

Witnesses:
   ARTHUR HENRY BROWN,
   EDGAR NORTON WHEELER.

Copies of this patent may be obtained for five cents each, by addressing the "Commissioner of Patents, Washington, D. C."